United States Patent [19]

O'Reilly et al.

[11] Patent Number: 5,236,594
[45] Date of Patent: Aug. 17, 1993

[54] PROCESS FOR REMOVING TOXICANTS FROM AQUEOUS PETROLEUM WASTE STREAMS

[76] Inventors: Kirk T. O'Reilly, 3810 Valley La., El Sobrante, Calif. 94803; John P. Suzuki, 2325 Wright Ave., Pinole, Calif. 94564

[21] Appl. No.: 834,752

[22] Filed: Feb. 12, 1992

[51] Int. Cl.$^5$ .................... B01D 15/00; C02F 1/28
[52] U.S. Cl. .................... 210/656; 210/662; 210/674; 210/692; 436/161; 436/178
[58] Field of Search ............ 210/656, 662, 674, 692; 436/161, 178

[56] References Cited

U.S. PATENT DOCUMENTS

| | | | |
|---|---|---|---|
| 3,531,463 | 9/1970 | Gustafson | 260/211.5 |
| 3,803,030 | 4/1974 | Montanaro et al. | 210/26 |
| 3,853,758 | 12/1974 | Hurwitz et al. | 210/27 |
| 4,297,220 | 10/1981 | Meitzner et al. | 210/690 |
| 4,399,274 | 8/1983 | Goegelman et al. | 536/7.1 |

OTHER PUBLICATIONS

Rogers, I. H.; "An Effective Method for the Isolation of Fish-Toxic Organic Solutes . . . "; vol. 28; Bi-monthly Research Notes 1972.
Kunin, R.; "Polymeric Adsorbents for Treatment of Waste Effluents"; Poly Eng. & Sci; Jan. 1977; pp. 58–62.
Kennedy, David C.; "Macroreticular Polymeric Adsorbents"; Ind. Eng. Chem. Prod. Res. Dev.; vol. 12, No. 1; 1974 pp. 56–61.
Rogers, I. H.; "Environmental Effects of Terpenoid Chemicals: A Review"; J. Am. Oil Chem. Soc.; Feb. 1978; pp. 113A–118A.

*Primary Examiner*—Ivars Cintins
*Attorney, Agent, or Firm*—J. W. Ambrosius; J. A. Hagenah; W. K. Turner

[57] ABSTRACT

Specific toxicants are selectively removed from aqueous waste streams associated with the production of petroleum and petroleum products by contacting such aqueous waste streams with a non-ionic macroreticular polymeric resin having a low to intermediate surface polarity. The toxicants are a group of structurally-related organic molecules containing at least one carboxylic acid group and having a molecular weight in the range of about 200 to about 400. These molecules are toxic to certain indicator species of fish at concentrations of less than 10 parts per billion.

27 Claims, 2 Drawing Sheets

PROCESS FOR REMOVING TOXICANTS FROM AQUEOUS PETROLEUM WASTE STREAMS

BACKGROUND OF THE INVENTION

1. Field of the Invention

The present invention relates to a process for removing an organic toxicant from an aqueous waste stream using a polymeric adsorbent. More particularly, the present invention relates to a process for selectively removing specific organic toxicants from aqueous waste streams associated with the production of petroleum and petroleum products by contacting such waste streams with a non-ionic macroreticular polymeric resin.

2. Description of the Related Art

Wastewater produced by certain industrial processes often contains toxic materials that are unique to the particular industry involved. Each industry, therefore, seeks to employ the most effective and economical methods available to treat or remove the particular toxicants found in that industries' effluent wastewater.

In the petroleum industry, a number of methods are currently used to render contaminated wastewater suitable for discharge, including microbial biodegradation and treatment with activated carbon. The treated effluent produced by these processes is typically monitored to determine its suitability for discharge. One increasingly important method of monitoring effluent toxicity uses a bioassay technique in which an indicator species, such as a species of fish known to be sensitive to certain toxicants, is exposed to the treated wastewater to determine if the water contains any residual toxicity. In recent years, such bioassays have become more stringent by using indicator species which are increasingly sensitive to the presence of very low levels of aquatic toxicants.

Using such bioassay techniques, aqueous waste streams associated with the production of petroleum and petroleum products have recently been found to be toxic to certain highly-sensitive species of indicator fish. We have discovered that this toxicity is caused by a specific group of organic materials. These newly-discovered organic materials are present in aqueous waste streams at extremely low levels. However, even at concentrations of less than 10 parts per billion, these materials are highly toxic to the indicator species of fish. Thus, aqueous waste streams containing these materials must be treated prior to discharge to reduce the concentration of these toxicants to an acceptable level.

These newly-discovered organic toxicants do not appear to be readily biodegraded under the conditions currently employed to treat aqueous petroleum waste streams. More costly effluent treatment using activated carbon has been found to reduce the concentration of these toxicants to acceptable levels, however, activated carbon is not selective for these specific toxicants and removes most organic matter present in the waste stream. Thus, the use of activated carbon to remove these specific organic toxicants is both inefficient and uneconomical.

Therefore, a new method or process is required to selectively remove these newly-discovered organic toxicants from aqueous waste streams.

The use of non-ionic polymeric adsorbents to treat industrial waste effluents has been described previously. For example, R. Kunin in *Polymer Engineering and Science*, 17, 58 (1977), describes the use of non-ionic macroreticular resins, such as AMBERLITE ® XAD resins, to treat aqueous industrial wastes containing phenol or various organic acids, bases and neutral organic compounds. R. A. Moore and F. W. Karasek in Intern. J. Environ. Anal. Chem., 17, 187 (1984), also discuss the extraction of organic compounds from aqueous media by AMBERLITE ® XAD resins.

Similarly, D. C. Kennedy in Ind. Eng. Chem. Prod. Res. Develop., 12, 56 (1973), describes the adsorption of phenols and chlorinated hydrocarbons from aqueous solutions using AMBERLITE ® XAD-4. Also discussed is the use of AMBERLITE ® XAD-8 to decolorize kraft pulp mill effluents.

Bleached kraft effluents have been shown by I. H. Rogers in *Bimon. Res. Notes Can. Forest. Serv.*, 28(4), 24 (1972), to contain organic components which are toxic to sockeye salmon fry (*Oncorhynchus nerka*). These toxic components were recovered from the kraft mill wastes using AMBERLITE ® XAD-2 resin. Rogers later reported in J. Am. Oil Chemists' Soc., 55, 113A (1978), that the main toxic components of bleached kraft effluents are terpenoid resin acids such as abietic acid, dehydroabietic acid, isopimaric acid, palustric acid and pimaric acid. Such terpenoid resin compounds are not believed to be the cause of the toxicity discussed herein.

U.S. Pat. No. 3,531,463, issued Sep. 29, 1970 to R. L. Gustafson et al., discloses a process for separating a dissolved water-soluble organic substance having a hydrophobic portion and a hydrophilic portion from an aqueous medium by contacting the medium with particles of an essentially non-ionogenic, macroreticular water-insoluble cross-linked polymer.

U.S. Pat. No. 3,803,030, issued Apr. 9, 1974 to R. A. Montanaro et al., discloses a process of removing contaminants, such as color bodies and metals, from a liquid medium using a solvent-regenerable macroreticular polymer resin.

U.S. Pat. No. 3,853,758, issued Dec. 10, 1974 to M. J. Hurwitz et al., also teaches that effluents from dye manufacturing and dyeing operations can be decolorized by using a combination of a primary polymeric adsorbent composed of a non-ionogenic macroreticular adsorbent and a secondary adsorbent comprising a weak-electrolyte ion exchange resin to remove the color bodies.

U.S. Pat. No. 4,297,220, issued Oct. 27, 1981 to E. F. Meitzner et al., discloses a method for adsorbing an organic material from a fluid or fluid mixture using a macroreticulated crosslinked copolymer.

Similarly, U.S. Pat. No. 4,399,274, issued Aug. 16, 1983 to R. T. Goegelman et al., describes a process for isolating and separating non-ionic lipophilic substances, specifically avermectin compounds, from solution in water, organic solvents or miscible mixtures thereof using an insoluble synthetic resin which is an addition copolymer having a cross-linked structure.

SUMMARY OF THE INVENTION

The present invention is directed to a process for selectively removing a toxicant from an aqueous waste stream associated with the production of petroleum or petroleum products, wherein the toxicant is characterized as a thermally stable organic molecule having a molecular weight in the range from about 200 to about 400 and containing at least one carboxylic acid group, said toxicant being further characterized as toxic to certain indicator species of fish at concentrations of less than about 10 ppb, the process comprising the steps of contacting the waste stream with an activated non-ionic macroreticular polymeric resin having a low to intermediate surface polarity for a time sufficient to reduce the amount of the toxicant in the waste stream to a preselected level and then recovering the water from the resin with a reduced level of toxicity.

Another embodiment of the invention is directed to a method of detecting the toxicant in an aqueous waste stream, usually an aqueous waste stream associated with the production of petroleum or petroleum products, the method comprising the steps of contacting the aqueous stream with an activated non-ionic macroreticular polymeric resin having a low to intermediate surface polarity for a time sufficient to adsorb a detectable-amount of the toxicant on the resin, then washing the resin with an extraction solvent under conditions effective for removal of organic material from the resin to produce a resin extract in the extraction solvent, and then subjecting a sample of the resin extract to high performance liquid chromatography under conditions effective for detection of the toxicant.

DETAILED DESCRIPTION OF THE INVENTION

Figure 1:
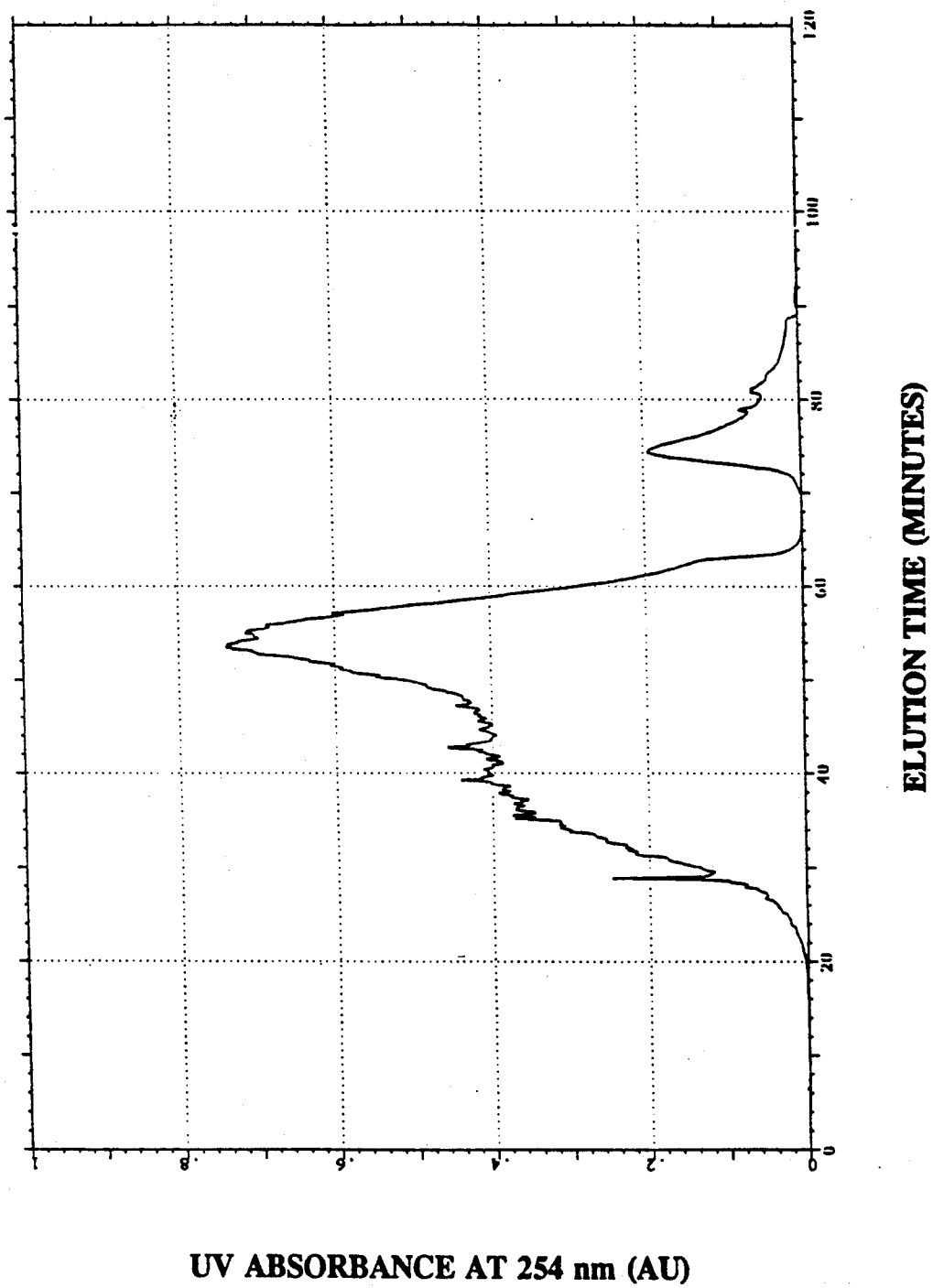
FIG. 1 shows a plot of UV absorbance at 254 nm (in AU) versus elution time (in minutes) for a sample of resin extract subjected to high performance liquid chromatography.

It has now been discovered that certain toxicants that appear to be associated with the production of petroleum or petroleum products can be selectively removed from aqueous waste streams by contacting such aqueous waste streams with a non-ionic macroreticular polymeric resin.

The toxicants with which the present invention is concerned are the specific organic molecules or group of structurally-related organic molecules having the properties described hereinbelow. These toxicants are hereinafter referred to as the "defined toxicants."

The terms "aqueous waste stream(s) associated with the production of petroleum or petroleum products" or "aqueous petroleum waste stream(s)" as used herein refer to an aqueous effluent which has contacted petroleum in any of its various crude forms or during its various stages of refining into petroleum products. Such aqueous effluent may, for example, be from crude oil sources, such as producing fields or offshore platforms; refinery process units, such as desalters or separators; or marketing terminals.

The terms "indicator species of fish" or "indicator fish species" as used herein refer to a species of fish, usually a fresh water species, belonging to the subclass teleostei, commonly referred to as bony fish, that are highly s sensitive, especially in the larval form, to certain toxicants and as such serve as indicators of the toxicants presence. Indicator species useful in identifying the presence of the defined toxicants disclosed herein include, but are not necessarily limited to, the fathead minnow (*Pimephales promelas*), rainbow trout (*Oncorhynchus mykiss*), and the threespine stickleback (*Gasterosteus aculeatus*). Non-fish species, including invertebrates such as mussels and sea urchins, and plants such as kelp, may also be used as indicator species.

The Toxicant

The defined toxicants with which the present invention is concerned are believed to be a group of structurally-related organic molecules that have been found in aqueous waste streams associated with the production of petroleum or petroleum products. The exact structure of these molecules has not been determined, however, the following description of their primary characteristics will make it possible for one skilled in the art to detect their presence in an aqueous stream.

The defined toxicants have a molecular weight in the range of from about 200 to about 400, most probably in the range from about 250 to about 350. The molecules are known to contain at least one or possible more carboxylic acid groups and to have both polar and nonpolar functional groups. In addition, the molecules may be a homologous series differing in structure by one carbon atom and may contain an odd number of nitrogen atoms, probably one or three nitrogen atoms.

The molecules have been found to be thermally stable at temperatures of up to about 100° C. for at least 6 hours and chemically stable at temperatures between about 0° and 25° C. in solutions of methanol and dichloromethane for periods in excess of one year. The molecules also remain toxic after wet air oxidation (autoclaving) for 20 minutes. The toxicants are soluble in a variety of solvents, including water, methanol, and dichloromethane.

The defined toxicants have been identified in the effluent associated with various petroleum processes, including, but not necessarily limited to aqueous effluent from petroleum production sites and refinery waste streams.

The presence of the defined toxicants in such aqueous waste streams can be determined by selectively extracting organic material from the stream using an activated non-ionic macroreticular polymeric resin and then analyzing this resin extract using a chromatographic technique, such as high performance liquid chromatography ("HPLC"), to detect the defined toxicants. High performance liquid chromatography is also useful for preparing a highly purified form of the defined toxicants suitable for determining their level of toxicity to indicator fish species and for structure elucidation studies.

To determine if the defined toxicants are present in an aqueous waste stream, the stream is first contacted with an activated non-ionic macroreticular polymeric resin having a low to intermediate surface polarity, such as the resins described hereinbelow. Prior to use, the resin must be thoroughly pre-treated or activated by washing, rinsing or eluting the resin with a suitable activation solvent. This pretreatment removes any residual organic materials adsorbed on the resin which might interfere with subsequent analytical or structure elucidation studies. Suitable activation solvents are generally volatile organic solvents having an intermediate to high polarity, such as low molecular weight alcohols, ketones, ethers, esters, and chlorinated hydrocarbons or mixtures thereof. The activation solvent may contain inert liquids, such as water or hydrocarbons, which are not detrimental to the activation process. Preferably, the activation solvent has a dielectric constant greater than about 4 at ambient temperature (20°-25° C). Examples of suitable activation solvents include methanol, ethanol, isopropanol, acetone, methyl ethyl ketone, diethyl ether, ethyl acetate, dichloromethane, chloroform and trichloroethane and mixtures thereof. The preferred activation solvent is methanol.

After Washing with the activation solvent, the resin is preferably rinsed with water, prior to contact with the aqueous waste stream, to remove the activation solvent.

When contacted with the aqueous stream, the resin selectively adsorbs organic material from the stream, including the defined toxicants if present and other nontoxic organic materials. The resin is typically contacted with a sufficient amount of the aqueous stream for a time sufficient to allow the resin to adsorb a detectable-amount of the defined toxicants. The amount of aqueous waste stream sufficient for the resin to adsorb a detectable-amount of the defined toxicants will vary depending on the concentration of the toxicants in the stream. Typically, the resin is contacted with about 0.5 to about 20 liters, preferably about 10 liters, of the aqueous stream being analyzed per gram of resin. The contact time between the resin and the aqueous stream will also vary depending on the resin composition and its physical properties; the method of contacting the resin and aqueous stream, such as in a batch or continuous mode; and the concentration of defined toxicants in the stream being analyzed. Generally, contact times will range from about 1 to 60 minutes, preferably 2 to 10 minutes.

After contacting the resin with the aqueous stream for a sufficient period of time, the resin is separated from the stream and extracted with an extraction solvent to remove the organic material adsorbed on the resin. The resin is typically contacted with two volumes of extraction solvent per volume of resin at least once and preferably 3 or more times. Suitable extraction solvents are the same as the activation solvents described hereinabove, although the extraction solvent need not be the same as the solvent used to activate the r®sin. The extraction solvent may contain inert liquids, such as water or hydrocarbons, which are not detrimental to the extraction process. Preferred extraction solvents are methanol, acetone, dichloromethane, chloroform, diethyl ether and ethyl acetate or mixtures thereof. An especially preferred extraction solvent is methanol.

Extraction of the resin gives a resin extract dissolved in the extraction solvent. This resin extract consists of the organic material selectively adsorbed on the resin from the aqueous stream, including the defined toxicants if they were originally present in the aqueous stream. The extract solution can be analyzed directly for the presence of the defined toxicants by high performance liquid chromatography, however, it is often desirable to remove the extraction solvent by standard separation procedures, such as distillation or evaporation at reduced pressure, to give the resin extract essentially free of extraction solvent. This resin extract can then be redissolved in a suitable solvent, such as methanol, at an appropriate concentration for HPLC analysis. Typically, at least about 1 nanogram, preferably more, of the defined toxicant is required per HPLC injection for suitable detection of the defined toxicants.

In a preferred embodiment, a major amount of the non-toxic organic material is removed from the resin extract prior to HPLC analysis by dissolving the resin extract in a partitioning solvent and intimately contacting this solution with water. This procedure typically removes greater than 90 percent of the non-toxic organic material present in the resin extract. The partitioning solvent is preferably a chlorinated solvent such as dichloromethane, chloroform or trichloroethane. Preferably, the partitioning solvent is dichloromethane.

The resin extract in the partitioning solvent is typically contacted with water by shaking the mixture in a separatory funnel and then separating the water layer from the partitioning solvent layer. Other methods of intimately contacting the partitioning solvent solution with water are equally suitable. Preferably, after separating the partitioning solvent solution from the water layer, the solution is again contacted with water and the layers again separated. Preferably, the partitioning solvent solution is extracted at least 3 times with water. The separated water layers may also be re-extracted with fresh partitioning solvent to recover any of the defined toxicants dissolved in the water layers. The partitioning solvent solutions are then combined and concentrated by distillation or evaporation under reduced pressure to give a purified resin extract.

The presence of the defined toxicants in the resin extract is determined by analyzing the extract using high performance liquid chromatography. Under suitable conditions, high performance liquid chromatography separates the defined toxicants from the non-toxic organic material in the resin extract and thus serves to identify the presence of the defined toxicants in the extract. The HPLC conditions suitable for separating the defined toxicants from the non-toxic material will vary depending on the stationary phase, or column, employed and the mobile phase, or eluant, used to elute the column. From the following description, one skilled in the art will be able to determine suitable conditions for detection of the defined toxicants in a sample of resin extract using high performance liquid chromatography.

The stationary phase employed is preferably a reverse-phase column. More preferably, the stationary phase is a reverse-phase octadecyl silane column.

The mobile phase, or eluant, is preferably a polar solvent or mixture of polar solvents, such as water, polar organic solvents, such as acetonitrile and methanol, and dilute aqueous solutions of weakly dissociated acids, such as acetic acid and phosphoric acid.

The flow rate of the eluant is typically about 1 mL per minute per 5 mm of column diameter. Eluant fractions may be collected, generally at one minute intervals, using a fraction collector. The detector employed in typically a UV detector, preferably a diode array UV detector. Other useful detectors include capillary ion, CI, detectors or CIA detectors.

When employing an octadecyl silane reverse-phase column, the column in preferably eluted first with a linear triple solvent gradient consisting of water, acetonitrile and a dilute aqueous solution of acetic acid (about 5% v/v), and then purged with 100% methanol. The triple solvent gradient is preferably employed as the eluant from the initial time of injection of the resin extract to about 65 minutes after injection. The column is then purged with methanol from about 65 minutes after injection to about 85 minutes after injection. The column in then re-equilibrated with the triple solvent gradient from about 85 minutes after injection to about 120 minutes after injection.

The exact elution times for the defined toxicants will vary depending on the high performance liquid chromatography conditions. Using the specific conditions described hereinabove, the defined toxicants consistently elute in two regions between about 48 to about 65 minutes and about 75 to about 80 minutes. The 48 to 65 minute region represents about 75-85% of the toxicity and the region from 75 to 80 minutes represents the remaining 15-25% toxicity. The two regions of toxicity may represent two distinct sub-classes of compounds. The eluant containing the defined toxicants can also be subjected to other analytical techniques, such as GC MS/MS, to further confirm the presence of the defined toxicants or for structure elucidation studies.

The defined toxicants are highly toxic to certain indicator species of fish. The toxicity can be measured by well-known procedures, such as those described by the Environment Protection Agency in "Methods for Measuring the Acute Toxicity of Effluents to Freshwater and Marine Organisms" (EPA/600/4-85/013, March 1985). Short-term chronic toxicity can be determined using "Short-Term Methods for Estimating the Chronic Toxicity of Effluents and Receiving Waters to Marine and Estuarine Organisms" (EPA/600/4-87/028, May 1988). The toxicity is typically measured as the 96-hour median lethal concentration ("96-hour $LC_{50}$"). This is the concentration of toxicant in water that is lethal to 50% of the indicator species during a 96-hour test period. For the defined toxicants described in the present invention, the 96-hour $LC_{50}$ is typically expressed in $\mu L$ of extract per liter of bioassay, $\mu L/L$, because of the difficulty in isolating sufficient quantities of the defined toxicants to determine an $LC_{50}$ by weight.

The most sensitive indicator species to the defined toxicants described in this invention is the 30 to 90-day old rainbow trout (*Oncorhynchus mykiss*). Using crude resin extract, the 96-hour $LC_{50}$ value for rainbow trout is about 31 $\mu L/L$. Another sensitive indicator species is the larval stage of fathead minnow (*Pimephales promelas*), which has a 96-hour $LC_{50}$ for the crude extract of about 52 $\mu L/L$. An estuarine indicator species, the threespine stickleback (*Gasterosteus aculeatus*) has a 96-hour $LC_{50}$ value for the crude extract of about 87 $\mu L/L$.

These newly-discovered toxicants are substantially more toxic than any organic materials previously known to be present in aqueous petroleum waste streams. For example, naphthenic and natural petroleum sulfonic acids, commonly associated with petroleum wastewaters, have a 96-hour $LC_{50}$ value in the fathead minnow bioassay of at least about 1-5 ppm, Whereas the newly-discovered toxicants are toxic at concentrations of less than 0.01 ppm or 10 ppb.

The Polymeric Absorbent

The non-ionic macroreticular polymeric resins employed in the process of the present invention are well-known in the art. Suitable resins, for example, are described in *Industrial and Engineering Chemistry, Product Research and Development*, 12, 56 (1973). A number of such resins are commercially available, including those sold under the tradenames AMBERLITE® XAD by Rohm and Haas Company, Philadelphia, Pa.; DUOLITE ES by Chemical Process Company, Redwood City, Calif.; and DIAION® HP by Mitsubishi Chemical Industries Limited, Tokyo, Japan.

These non-ionic macroreticular polymeric resins are generally prepared by polymerizing cross-linking monomers or mixtures of monomers in the presence of a phase separating solvent which is miscible with the monomers, but which does not dissolve the polymer. Typical procedures for preparing suitable macroreticular resins are described in U.S. Pat. Nos. 3,275,548, 3,357,158, 3,663,467, 4,224,415 and 4,297,220, the entire disclosures of which are incorporated herein by reference.

Typical non-ionic macroreticular polymeric resins which may be employed include, for example, the granular cross-linked polymers prepared by suspension polymerization of polymerizable ethylenically unsaturated molecules comprising about 10 to 100 weight percent, preferably 40 to 100 weight percent, of at least one poly(vinylbenzene) monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus, such as those described in U.S. Pat. No. 3,531,463. In addition to the homopolymers and copolymers of these poly(vinylbenzene) monomers, suitable resins may be prepared by copolymerizing one or more of these poly(vinylbenzene) monomers with up to 90 percent (by weight of the total monomer mixture) of (1) monoethylenically unsaturated monomers, or (2) polyethylenically unsaturated monomers other than the poly(vinylbenzenes) defined hereinabove or (3) a mixture of (1) and (2).

Examples of the alkyl-substituted di- and trivinylbenzenes are the various divinyltoluenes, the divinylxylenes, divinylethylbenzene, 1,4-divinyl-2,3,5,6-tetramethylbenzene, 1,3,5-trivinyl-2,4,6-trimethylbenzene, 1,4-divinyl, 2,3,6-triethylbenzene, 1,2,4-trivinyl-3,5-diethylbenzene, 1,3,5-trivinyl-2-methylbenzene.

Examples of other non-ionic polyethylenically unsaturated compounds, which can comprise up to 90 weight percent of the polymer, include: divinylnaphthalenes, diallyl phthalate, ethylene glycol diacrylate, ethylene glycol dimethacrylate, divinylsulfone, polyvinyl or polyallyl ethers of glycol, of glycerol, of pentaerythritol, of monothio or dithioderivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylnaphthalenes, and polyvinylanthracenes.

Examples of non-ionic monoethylenically unsaturated monomers that may be used in making the macroreticular resins include methyl acrylate, ethyl acrylate, propyl acrylate, isopropyl acrylate, butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, ethylene, propylene, isobutylene, diisobutylene, styrene, vinyltoluene, vinyl chloride, vinyl acetate, vinylidene chloride, acrylonitrile, etc. Polyethylenically unsaturated monomers which ordinarily act as though they have only one such unsaturated group, such as isoprene, butadiene, and Chloroprene, may be used as part of this monoethylenically unsaturated category. These monomers can be used in a concentration of up to 90 weight percent of the polymer.

Alternatively, the non-ionic all aliphatic macroreticular polymeric resins as exemplified in U.S. Pat. No. 3,663,467 may be used as the adsorbent in the process of the present invention. These resins are essentially all aliphatic in character and are crosslinked with a polyfunctional methacrylate (containing at least three methacrylate groups). The preferred polyfunctional methacrylate is trimethylolpropane trimethacrylate or pentaerythritol tetramethacrylate. However, the trimethacrylate of glycerol, glucose pentamethacrylate, sorbitol hexamethacrylate and the polyfunctional methacrylates of polyhydric alcohols of 3 to 6 carbon atoms in chain length may also be used. These poly-functional methacrylates must contain at least three methacrylate groups as heretofore noted. Sutro polyols which are commercially available mixtures of essentially straight chain polyhydric alcohol of 3 to 6 carbon atoms may be used as the source of polyhydric alcohol.

These all-aliphatic polymers contain 10 to 100 percent by weight of the polyfunctional methacrylate having at least 3 methacrylate groups, and preferably from 40 to 100 percent by weight of said polyfunctional methacrylate. Typical aliphatic, non-aromatic, non-ionic, monoethylenically unsaturated co-monomers which may be copolymerized with the polyfunctional methacrylate include, for example, ethylene, isobutylene, acrylonitrile, methacrylonitrile, acrylamide, methacrylamide; diacetone acrylamide, vinyl esters (including vinyl chloride, vinyl acetate, vinyl propionate, vinyl butyrate, vinyl laurate), vinyl ketones (including vinyl methyl ketone, vinyl ethyl ketone, vinyl isopropyl ketone, vinyl n-butyl ketone, vinyl hexyl ketone, vinyl octyl ketone, methyl isopropenyl ketone), vinyl ethers (including vinyl methyl ether, vinyl ethyl ether, vinyl propyl ether, vinyl isobutyl ether), vinylidene compounds (including vinylidene chloride, bromide, or bromochloride), esters of acrylic acid and methacrylic acid such as the methyl, ethyl, 2-chloroethyl, propyl, isopropyl, n-butyl, isobutyl, t-butyl, sec-butyl, amyl, hexyl, glycidyl, ethoxyethyl, cyclohexyl, octyl, 2-ethylhexyl, decyl, dodecyl, hexadecyl and octadecyl esters of these acids, hydroxyalkyl methacrylates and acrylates such as hydroxyethyl methacrylate and hydroxypropyl methacrylate, substituted acrylamides, such as N-monoalkyl, -N,N-dialkyl, and N-dialkyl-aminoalkylacrylamides or methacrylamides where the alkyl groups may have from 1 to 18 carbon atoms, such as methyl, ethyl, isopropyl, butyl, hexyl, cyclohexyl, octyl, dodecyl, hexadecyl, and octadecyl. If desired, difunctional methacrylates such as ethylene glycol dimethylacrylate or trimethylolpropane dimethacrylate can be used as comonomers.

The ability of a particular resin to selectively adsorb the defined toxicants described herein in preference to other non-toxic organic material is determined in large part by the surface properties of the resin. Such surface properties include surface polarity, surface area and average pore diameter.

Suitable resins have a surface area in the range of about 100 to about 1,000 m$^2$/g, and an average pore diameter in the range of about 20 to about 250 Å. Preferably, the resin will have a surface area of about 400 to about 800 m$^2$/g, more preferably about 450 m$^2$/g, and an average pore diameter of about 50 to about 90 Å, more preferably about 80 Å.

Useful resins also have a low to intermediate surface polarity. Surface polarity is generally related to the inherent dipole moment of the functional group or groups present in the monomer or mixture of monomers used to prepare the polymeric resin. Monomers containing functional groups which have a low inherent dipole moment, such as styrene and divinylbenzene, typically have a low surface polarity. Monomers containing functional groups having an intermediate inherent dipole moment, such a acrylate esters, have an intermediate surface polarity. Preferably, the resins used in the present process have an intermediate surface polarity.

More polar ion-exchange resins, such as Dowex Anion 1X8, have been found to readily adsorb a majority of the organic material in aqueous petroleum waste streams, including the newly-discovered toxicants described herein. These resins, however, are not easily regenerated, since the adsorbed organic matter cannot be sufficiently eluted from such resins using a suitable solvent. More importantly, the use of such resins for the treatment of aqueous petroleum waste streams is generally undesirable, because such waste streams typically contain relatively high concentrations of sulfate anions or other fouling agents which rapidly saturate anion exchange resins.

The non-ionic macroreticular polymeric resins are typically employed in this invention in the form of beads or granules having a particle size of about 0.1 to about 3 millimeters average diameter. Nominal mesh sizes range from about 20 to about 50.

In a preferred embodiment of the present invention, the nonionic macroreticular polymeric resin is a copolymer of styrene and divinylbenzene having a low surface polarity and a surface area in the range of about 300 to about 800 m$^2$/g, preferably about 750 m$^2$/g and an average pore diameter of about 50 to about 90 Å, preferable about 50 Å. Resins having these properties are commercially available from Rohm and Haas Company under the tradenames AMBERLITE® XAD-2 and AMBERLITE® XAD-4.

In a more preferred embodiment, the non-ionic macroreticular polymeric resin is a polymer of a polyfunctional methacrylate, preferable trimethylolpropane trimethacrylate, having an intermediate surface polarity and a surface area in the range of about 100 to 400 m$^2$/g, preferably about 450 m$^2$/g and an average pore diameter of about 80 to about 250 Å, preferably about 80 Å. Resins having these properties are commercially available under the tradenames AMBERLITE® XAD-7 and AMBERLITE® XAD-8 from Rohm and Haas Company. AMBERLITE® XAD-7 resin represents an especially preferred resin for use in the process of this invention.

Process Conditions

In the adsorption process of the present invention, the defined toxicants are removed from an aqueous waste stream by contacting the waste stream with an activated non-ionic macroreticular polymeric resin having a low to intermediate surface polarity, such as the resins described hereinabove. The resin is contacted with the waste stream for a time sufficient to reduce the amount of the defined toxicants in the waste stream to a preselected level. The waste stream is then recovered from the resin with a reduced level of toxicity.

The adsorption process may be conducted in batch, semicontinuous or continuous operation. In a batch operation, for example, loose non-ionic macroreticular polymeric resin is mixed in a vessel of appropriate size with aqueous petroleum wastewater and, after sufficient contact time, the treated aqueous effluent is separated from the resin by filtration, centrifugation, decantation and the like. Two or more batch reactors may be used in series for increased adsorption efficiency.

Preferably, the process is conducted in a continuous operation. In continuous operation, the resin may be supported in a suitable vessel which, in most practical operations, normally take the form of a tower or column suitably packed with the resin particles. The aqueous petroleum Waste stream is passed through the resin mass at a suitable rate, such as top to bottom, or vice versa such that the defined toxicants are adsorbed on the resin. Alternatively, the resin particles may pass in counter-current relation to the aqueous effluent. For example, the resin granules may be continuously fed to the top of a column or tower into the bottom of which the effluent is fed continuously, the granules being removed from the bottom for subsequent regeneration. In an alternative embodiment, the resin may be immobilized on a substrate, for example on a grid or on the walls of a vessel, and the effluent passed over or through the resin.

The resin is contacted with the waste stream being treated for a time sufficient to reduce the amount of the defined toxicants to a preselected level. The concentration of the defined toxicants will normally be reduced to a level which is no longer toxic to the indicator species of fish. Preferably, the defined toxicants will be reduced to a level such that the defined toxicants are no longer detectable using the methods of the present invention. The defined toxicants are preferably reduced to a concentration of less than about 2 ppb, more preferably less than 0.1 ppb.

Contact time between the resin and the aqueous effluent will vary depending on the resin composition and physical properties; the method of operation, such as batch or continuous; and the concentration of toxicant in the effluent being treated. Generally, contact times will range from about 1 to 60 minutes, preferably 2 to 10 minutes.

Prior to use, the resins employed in the process of this invention are pre-treated or activated by washing, rinsing or eluting the resin with a suitable activation solvent. This pretreatment removes any residual organic materials adsorbed on the resin thus increasing the resin's capacity to adsorb the toxicant materials. Suitable activation solvents are generally volatile organic solvents having an intermediate to high polarity, such as low molecular weight alcohols, ketones, ethers, esters, and chlorinated hydrocarbons or mixtures thereof. The activation solvent may contain inert liquids, such as water or hydrocarbons, which are not detrimental to the activation process. Preferably, the activation solvent has a dielectric constant greater than about 4 at ambient temperature (20°-25° C.). Examples of suitable activation solvents include methanol, ethanol, isopropanol, acetone, methyl ethyl ketone, diethyl ether, ethyl acetate, dichloromethane, chloroform, trichloroethane or mixtures thereof. The preferred activation solvent is methanol.

The resin can be employed in the absorption process until the adsorption capacity of resin has been reached. The resin may then be regenerated or reactivated by washing the resin with one or more of the activation solvents described hereinabove to remove the adsorbed organic material. Preferably, the resin is regenerated by washing with methanol. The resin is typically washed for a time sufficient to remove essentially all of the adsorbed organic material, thus reactivating the resin for reuse. During the regeneration process, the resin is typically contacted with the activation solvent for at least about 5 minutes, more preferably about 10 to about 30 minutes. The resin is typically washed with 3 bed volumes, preferably 5 to 7 bed volumes, of the activation solvent. After washing, the reactivated resin is recovered or separated from the activation solvent for reuse. The activation solvent used for the regeneration process can also be recovered using standard solvent purification procedures, such as distillation, and the purified solvent recycled.

While other means have been found to remove the toxicant from aqueous waste streams, the process of the present invention has certain advantages over other methods. The non-ionic macroreticular polymeric resins have been found to have a high selectivity for removing the defined toxicants as compared to activated carbon. Thus, less adsorbent is required to remove the same amount of toxicant from a waste stream as compared to activated carbon. This translates into less bulk, an increase in the time between regenerations, and a reduction in the size of the equipment needed to accomplish the same degree of treatment. Another advantage is that reactivation of the resin may be carried out on site as contrasted with the use of activated carbon which generally requires off site reactivation. Ion exchange resins while capable of removing the toxicant are either not regenerable or may be regenerated only with great difficulty. Thus, the present invention makes it possible to develop a continuous process having the steps of regenerating the adsorbent on site by contacting it with a suitable activating solvent, recovering the activating solvent with the dissolved toxicant from the adsorbent, returning the adsorbent to service, and recycling the solvent. Further, using the present invention, a continuous processing flow scheme is possible in which treatment vessels containing the resin are connected in parallel, such that the vessels may be taken out of service for resin regeneration while other vessels continue to treat the effluent.

EXAMPLES

The following examples are presented to illustrate specific embodiments of the practice of this invention and should not be interpreted as limitations upon the scope of the invention.

EXAMPLE 1

Activation of AMBERLITE ® XAD-7 Resin

AMBERLITE ® XAD-7 resin (1 kilogram) was extracted in a soxhlet apparatus with HPLC-grade methanol for eight hours to remove residual organic contamination. The methanol-washed resin was then stored, for up to one year, in HPLC-grade methanol in a glass container. Prior to use, the methanol-washed resin was placed in a 2-liter glass column and washed with 5 column volumes of HPLC-grade water to produce an activated resin suitable for toxicant adsorption.

EXAMPLES 2A–G

Toxicant Adsorption Using AMBERLITE ® XAD-7 Resin Activated AMBERLITE ®XAD-7 resin from Example 1, in amounts ranging from 5.0 g/L to 0.025 g/L, was stirred at room temperature for 2 hours with 4.0 L of water collected from the outlet of a refinery effluent treatment system. Each mixture was filtered and the total organic carbon ("TOC") concentration determined using an OI Corporation Model 700 TOC analyzer. The analyzer had a reproducibility of about ±1-2 ppm. The initial untreated effluent had a TOC of 27.7. The TOC after treatment with each amount of resin is shown in Table 1.

The toxicity of each treated effluent was then determined using 30-90 day old rainbow trout by following procedures essentially as described in Example 10. The percent of fish surviving after 96-hours was recorded. In the untreated effluent, 20 percent of the fish survived. The percent survival after treatment of the effluent with various amounts of resin is shown in Table 1.

EXAMPLE 3A-F

Toxicant Adsorption Using AMBERLITE ® XAD-2 Resin

AMBERLITE ® XAD-2 was stirred with water collected from the outlet of a refinery effluent treatment system using the procedures described in Example 2. Prior to use, the resin had been activated using the procedures of Example 1. The TOC and the percent of fish surviving in the effluent after treatment with each amount of resin is shown in Table 1.

EXAMPLE 4A-F

Toxicant Adsorption Using AMBERLITE ® XAD-4 Resin

AMBERLITE ® XAD-4 was stirred with water collected from the outlet of a refinery effluent treatment system using the procedures described in Example 2. Prior to use, the resin had been activated using the procedures of Example 1. The TOC and the percent of fish surviving in the effluent after treatment with each amount of resin is shown in Table 1.

EXAMPLE 5A-F (COMPARATIVE)

Toxicant Adsorption Using Activated Carbon

Activated carbon (Calgon Filtersorb 300) was stirred with water collected from the outlet of a refinery effluent treatment system using the procedures described in Example 2. Prior to use, the carbon was washed with distilled water to remove fines. The TOC and the percent of fish surviving in the effluent after treatment with each amount of carbon is shown in Table 1.

The data in Table 1 shows that activated carbon (Examples 5A-F) removed significantly more total organic carbon (TOC) from the effluent than either AMBERLITE ® XAD-2, XAD-4 or XAD-7 (Examples 2A-G, 3A-F and 4A-F, respectively). For example, at 5 grams of adsorbent per liter of effluent, activated carbon removed 72% of the TOC (Example 5A), whereas AMBERLITE ® XAD-7 removed 30% of the TOC (Example 2A). Although AMBERLITE ® XAD-7 removed less TOC than activated carbon, 100% fish survival was observed for both adsorbents. Therefore, the AMBERLITE ® resin is more selective than activated carbon for adsorption of the defined toxicants.

TABLE 1

| Ex. No. | Adsorbent | Adsorbent Conc.(g/L) | TOC[1] After Adsorption | % TOC Adsorption[2] | % Survival[3] |
|---|---|---|---|---|---|
| 2A | XAD-7 | 5.00 | 19.4 | 30% | 100 |
| 2B | XAD-7 | 3.00 | 20.3 | 27% | NA |
| 2C | XAD-7 | 1.00 | 22.1 | 20% | 100 |
| 2D | XAD-7 | 0.50 | 23.9 | 14% | 100 |
| 2E | XAD-7 | 0.10 | 26.0 | 6% | 100 |
| 2F | XAD-7 | 0.05 | 26.8 | 3% | 100 |
| 2G | XAD-7 | 0.025 | 27.7 | <1% | 100 |
| 3A | XAD-2 | 5.00 | 14.8 | 47% | NA |
| 3B | XAD-2 | 3.00 | 16.4 | 41% | NA |
| 3C | XAD-2 | 1.00 | 19.0 | 31% | NA |
| 3D | XAD-2 | 0.50 | 22.2 | 20% | NA |
| 2E | XAD-2 | 0.10 | 23.6 | 15% | NA |
| 3F | XAD-2 | 0.05 | 26.0 | 6% | NA |
| 4A | XAD-4 | 5.00 | 20.0 | 28% | 100 |
| 4B | XAD-4 | 3.00 | 22.3 | 19% | NA |
| 4C | XAD-4 | 1.00 | 25.2 | 9% | 0 |
| 4D | XAD-4 | 0.50 | 25.5 | 8% | 0 |
| 4E | XAD-4 | 0.10 | 27.3 | 1% | 0 |
| 4F | XAD-4 | 0.05 | 27.6 | <1% | 0 |
| 5A | A. Carbon | 5.00 | 7.9 | 72% | 100 |
| 5B | A. Carbon | 3.00 | 12.8 | 54% | NA |
| 5C | A. Carbon | 1.00 | 20.5 | 26% | 100 |
| 5D | A. Carbon | 0.50 | 21.5 | 22% | 100 |
| 5E | A. Carbon | 0.10 | 25.5 | 8% | 100 |
| 5F | A. Carbon | 0.05 | 26.6 | 4% | 100 |

[1]TOC = Total Organic Carbon (Initial TOC = 27.7).
[2]Percent total organic carbon adsorbed by adsorbent.
[3]Percent of fish surviving after 96-hours; 20% survival in untreated effluent; NA = not available.

EXAMPLE 6

Toxicant Adsorption Using AMBERLITE ® XAD-7 Resin

Activated AMBERLITE ® XAD-7 resin (1200 grams) from Example 1 was placed in a 2100 mL glass column and water collected from the outlet of a refinery effluent treatment system was passed through the column at the rate of one column volume every two minutes. A total of 2460 L (650 gallons) of effluent water was passed through the column to give an effluent-contacted resin.

EXAMPLE 7

Toxicant Isolation from AMBERLITE® XAD-7 Resin

The effluent-contacted AMBERLITE® XAD-7 resin from Example 6 was extracted three times with two column volumes of HPLC-grade methanol to remove the organic material, including the defined toxicants. The combined methanol extracts were transferred in small portions to a round-bottomed flask and roto-evaporated to dryness on a Buchi rotovapor with an attached water bath maintained at 30° C. The dried organic material was then reconstituted with HPLC-methanol and brought up to a fixed volume of 100 mL. This stock solution was used for further isolation and characterization experiments.

EXAMPLE 8

Toxicant Purification Using Solvent:Solvent Partitioning

A 10 mL aliquot of the stock solution from Example 7 was roto-evaporated to dryness on a Buchi rotovapor with an attached water bath maintained at 30° C. The dried sample was reconstituted with four separate 25 mL portions of HPLC-grade water and the water solutions were combined in a 250 mL separatory funnel. The round-bottomed flask which contained the sample was then washed with four separate 25 mL portions of HPLC-grade dichloromethane and the dichloromethane washings were transferred to the same 250 mL separatory funnel containing the reconstituted sample. The separatory funnel was mixed by inversion for about 5 minutes and then allowed to settle undisturbed for 60 minutes to allow the water and dichloromethane layers to separate. The dichloromethane layer was then drained into another 250 mL separatory funnel, and 100 mL of fresh HPLC-grade water was added to this funnel. An additional 100 mL of fresh dichloromethane was also added to the first separatory funnel. Both funnels were mixed by inversion for about 5 minutes and allowed to settle until the water and dichloromethane layers had separated. This procedure was repeated with the addition of a third separatory funnel. The initial water sample was extracted three times with fresh HPLC-grade dichloromethane, and each dichloromethane portion was extracted three times with fresh HPLC-grade water. All dichloromethane portions were then combined.

EXAMPLE 9

HPLC Fractionation of the Toxicant

The dichloromethane extract from Example 8 was roto-evaporated to dryness and brought to a volume of 10 mL in a volumetric flask using HPLC-grade methanol. This sample was then filtered through a 0.2 micron syringe filter, and 200 μL injected into a Waters HPLC system.

The HPLC system consisted of a Waters Model 600 pump equipped with 100 uL pump heads interfaced to a Waters Model 600E gradient controller. Injections were made with a Waters 712 WISP Auto-sampler equipped with refrigeration, set at 5° C. The detectors were a Waters Model 991 Photodiode Array ultraviolet detector, set to scan 190 to 400 nm, and a Waters Model 410 Differential Refractometer, set at full scan. The column used was a Beckman Ultrasphere ODS (10×250 mm) protected with a Rainin ODS guard column (4.6×30 mm). The HPLC components were interfaced to a NEC 386/25 CPU which controlled all operation parameters, data collection, and data integration during the HPLC run using the following software packages:

Waters 991 Powerline Control ver. 6.22a
Waters 990+/991 Foreground/Background ver. 6.22a
Waters 990+4 Channel A/D Control Card APC-IV ver. 5.025-4/89
Microsoft MS DOS 3.3 rev. 3.0
Microsoft Windows 3.0 run time version The eluant was as follows:

| Time (Min.) | % A | % B | % C | % D |
|---|---|---|---|---|
| 0–50 | 5.0 | 90.0 | 5.0 | 0.0 |
| 50–55 | 90.0 | 5.0 | 5.0 | 0.0 |
| 55–60 | 90.0 | 10.0 | 0.0 | 0.0 |
| 60–65 | 5.0 | 90.0 | 5.0 | 0.0 |
| 65–85 | 0.0 | 0.0 | 0.0 | 100.0 |
| 85–120 | 5.0 | 90.0 | 5.0 | 0.0 | where A is water, B is acetonitrile, C is a 5% v/v solution of acetic acid in water, and D is methanol. The flow rate was 2 mL per minute.

An LKB Super Rac fraction collector, activated by HPLC control, was used to collect 120 fractions at 1 minute intervals starting from time 0 (the time of sample injection). The HPLC chromatogram for this run showing UV absorbance versus elution time is shown in FIG. 1.

Each of the 120 fractions was analyzed for toxicity using the fathead minnow larvae 96-hour bioassay screening described in Example 10. Fractions found to be toxic were further screened for $LC_{50}$ determination using fathead minnow larvae. The results of these bioassays are shown in Table 2 (Example 9A). Table 2 also shows the results of an identical HPLC run using a 400 μL sample of the same methanol solution (Example 9B) and a repeat run using a 200 μL sample (Example 9C).

The data in Table 2 shows that the defined toxicants were present in the eluant fractions collected in the range from about 48 to about 65 minutes and about 75 to about 80 minutes.

Figure 2:
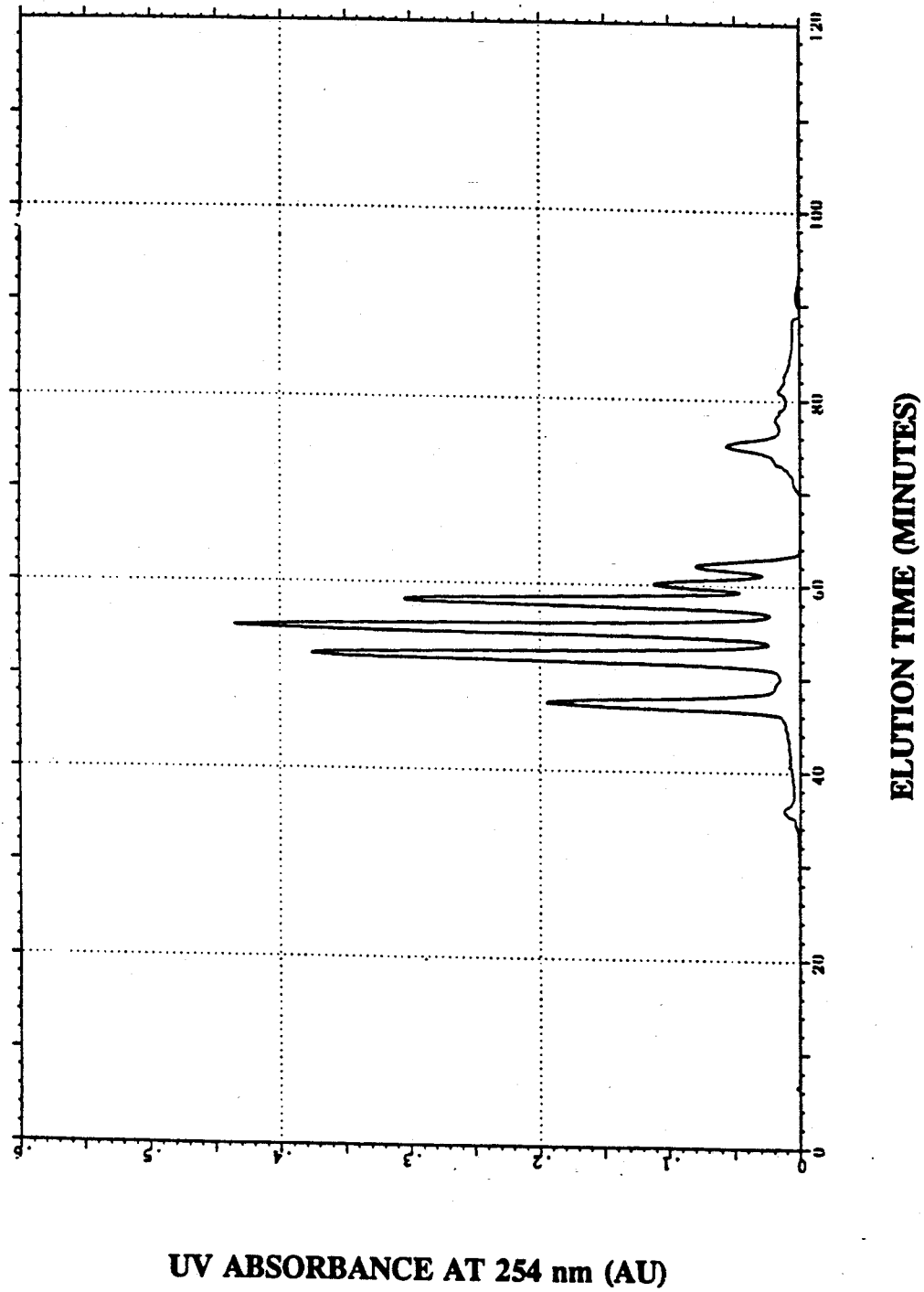
FIG. 2 shows a plot of UV absorbance at 254 nm (in AU) versus elution time (in minutes) for a combined sample of resin extract fractions initially collected at 48, 53, 56, 59, 61, 63 and 76 minutes and re-subjected to high performance liquid chromatography.

Re-injection of a combined sample of the fractions collected at 48, 53, 56, 61, 63 and 76 minutes under the same HPLC conditions gave a series of sharp peaks shifted downward by about one minute from each original peak as shown in FIG. 2.

TABLE 2

| HPLC Sample No. | Example 9A (200 μL) | | Example 9B (400 μL) | | Example 9C (200 μL) | |
|---|---|---|---|---|---|---|
| | 96-h $LC_{50}$[1] | Rel. Tox.[2] | 96-h $LC_{50}$ | Rel. Tox. | 96-h $LC_{50}$ | Rel. Tox. |
| 1–47 | NT[3] | 0.0 | NT | 0.0 | NT | 0.0 |
| 48 | 136 | 1.8 | 165 | 1.5 | 177 | 1.4 |
| 49 | 136 | 1.8 | 177 | 1.4 | 190 | 1.3 |
| 50 | 208 | 1.2 | 164 | 1.5 | 177 | 1.4 |
| 51 | 136 | 1.8 | 190 | 1.3 | 155 | 1.6 |
| 52 | 155 | 1.6 | 146 | 1.7 | 155 | 1.6 |
| 53 | 178 | 1.4 | 76 | 3.3 | 99 | 2.5 |
| 54 | 229 | 1.1 | 146 | 1.7 | 107 | 2.3 |
| 55 | 146 | 1.7 | 136 | 1.8 | 146 | 1.7 |
| 56 | 136 | 1.8 | 82 | 3.0 | 88 | 2.8 |
| 57 | 146 | 1.7 | 65 | 3.8 | 71 | 3.2 |
| 58 | 155 | 1.6 | 86 | 2.9 | 73 | 3.4 |
| 59 | 89 | 2.8 | 78 | 3.2 | 82 | 3.1 |
| 60 | 146 | 1.7 | 62 | 4.0 | 88 | 2.8 |
| 61 | 164 | 1.5 | 60 | 4.2 | 95 | 2.6 |
| 62 | 164 | 1.5 | 78 | 3.2 | 106 | 2.4 |

TABLE 2-continued

| HPLC Sample No. | Example 9A (200 μL) | | Example 9B (400 μL) | | Example 9C (200 μL) | |
|---|---|---|---|---|---|---|
| | 96-h LC$_{50}$[1] | Rel. Tox.[2] | 96-h LC$_{50}$ | Rel. Tox. | 96-h LC$_{50}$ | Rel. Tox. |
| 63 | 155 | 1.6 | 74 | 3.4 | 106 | 2.4 |
| 64 | NT | 0.0 | 100 | 2.5 | 250 | 1.0 |
| 65 | 250 | 1.0 | 177 | 1.4 | NT | 0.0 |
| 66–74 | NT | 0.0 | NT | 0.0 | NT | 0.0 |
| 75 | NT | 0.0 | NT | 0.0 | 88 | 2.8 |
| 76 | 155 | 1.6 | 62 | 4.0 | 88 | 2.8 |
| 77 | 155 | 1.6 | 62 | 4.0 | 146 | 1.7 |
| 78 | 155 | 1.6 | 95 | 2.6 | 155 | 1.6 |
| 79 | NT | 0.0 | 92 | 2.7 | 165 | 1.5 |
| 80 | NT | 0.0 | 114 | 2.2 | 213 | 1.2 |
| 81–120 | NT | 0.0 | NT | 0.0 | NT | 0.0 |
| | Total: | 32.4 | Total: | 61.3 | Total: | 49.1 |

[1]In μL/L.
[2]Relative toxicity: an LC$_{50}$ of 250 μL/L = 1.0.
[3]NT = Not toxic.

EXAMPLE 10

Toxicant Bioassay

The acute toxicity of test samples was determined using a fathead minnow larvae (*Pimephales promelas*) bioassay. In this test, 3–8 day old fathead minnow larvae, available from Aquatic Resources, Inc., Sebastopol, Calif., are maintained for at least two days under the same environmental conditions and feeding regime that will exist during the bioassay. During this acclimation period, mortality is recorded daily and the larvae are not used if the mortality is greater than 10% or if the larvae exhibit abnormal behavior or appearance.

The test solution is prepared by combining the appropriate volumes of test material or stock solution and diluent water. The diluent water has a dissolved oxygen concentration between 60 and 100%, a pH in the range of 7.3–7.7, and a temperature in the range of 16° C. to 24° C.

To begin the test, a 30-mL glass beaker is filled with 20 mL of the test solution and five fathead minnow larvae are transferred to the test solution using a medicine dropper (eyedropper). Only larvae having a normal appearance and size are selected for the bioassay. When the larvae have been transferred, the glass beaker is lightly covered with thin plastic film to limit evaporation and loss of volatile materials, while allowing some air circulation.

The water is maintained at a temperature of 19°–21° C. with a dissolved oxygen concentration of at least 60% and a pH in the range of 7.5–8.0. A photoperiod of 16 hours light per 24 hours is maintained, and the larvae are feed twice daily with one drop of diluted brine shrimp that are less than 24-hours old. The beaker is examined daily for four days after the start of the test and the mortality recorded. Dead larvae and bottom debris, if present, are removed using a medicine dropper.

By conducting a number of such tests using test solutions of varying concentrations, one skilled in the art can determine the LC$_{50}$ value of the test material.

What is claimed is:

1. A process for removing a toxicant from an aqueous waste stream associated with the production of petroleum or petroleum products wherein the toxicant is a thermally stable organic molecule having a molecular weight in the range from about 200 to about 400 and at least one carboxylic acid group, said toxicant further having a 96-hour median lethal concentration for larval rainbow trout and larval fathead minnows of less than about 10 ppb, said process comprising the steps of:
   (a) contacting the waste stream with an activated non-ionic macroreticular polymeric resin having low to intermediate surface polarity for a time sufficient to reduce the amount of said toxicant in said waste stream to a preselected level, and
   (b) recovering the waste stream from the resin with a reduced level of toxicity.

2. The process of claim 1 wherein the activated non-ionic macroreticular polymeric resin is a copolymer of styrene and divinylbenzene.

3. The process of claim 2 wherein the activated non-ionic macroreticular polymeric resin has a surface area in the range of about 300 to about 800 m$^2$/g and an average pore diameter of about 50 to about 90 Å.

4. The process of claim 3 wherein the activated non-ionic macroreticular polymeric resin is AMBERLITE ® XAD-2 or AMBERLITE ® XAD-4.

5. The process of claim 1 wherein the activated non-ionic macroreticular polymer resin is an essentially all aliphatic polymer comprising about 2 to 100 weight percent of a polyfunctional methacrylate containing at least three methacrylate groups.

6. The process of claim 5 wherein the activated non-ionic macroreticular polymeric resin has a surface area in the range of about 100 to 400 m$^2$/g and an average pore diameter of about 80 to about 250 Å.

7. The process of claim 6 wherein the polyfunctional methacrylate is trimethylolpropane trimethacrylate.

8. The process of claim 6 wherein the activated non-ionic macroreticular polymeric resin is AMBERLITE ® XAD-7.

9. The process of claim 1 including the additional steps of:
   (c) contacting the resin of step (b) with fresh activating solvent for a time sufficient to reactivate the resin,
   (d) recovering the reactivated resin from the activating solvent, and
   (e) using the reactivated resin of step (d) as the activated macroreticular polymeric resin used in carrying out step (a).

10. The process of claim 9 wherein the activation solvent is an organic solvent having a dielectric constant greater than about 4.0.

11. The process of claim 10 wherein the activation solvent is methanol, ethanol, isopropanol, acetone, methyl ethyl ketone, diethyl ether, ethyl acetate, dichloromethane, chloroform, trichloroethane or mixtures thereof.

12. The process of claim 11 wherein the activation solvent is methanol.

13. A method of detecting a toxicant in an aqueous waste stream, wherein said toxicant is a thermally stable organic molecule having a molecular weight in the range from about 200 to about 400 and containing at least one carboxylic acid group, said toxicant further having a 96-hour median lethal concentration for larval rainbow trout and larval fathead minnows of less than 10 ppb, said method comprising the steps of:
   (a) contacting the aqueous waste stream with an activated non-ionic macroreticular polymeric resin having a low to intermediate surface polarity for a time sufficient to adsorb a detectable-amount of the toxicant on the resin; thereafter, (b) washing the resin with an extraction solvent under conditions effective for the removal of organic material from the resin to produce a resin extract in the extraction solvent; and (c) subjecting a sample of the resin extract to high performance liquid chromatography under conditions effective for detection of the toxicant.

14. The method of claim 13 comprising the additional steps of:

(d) removing non-toxic organic material from the resin extract of step (b) by intimately contacting the resin extract in a partitioning solvent with water; thereafter, (e) separating the partitioning solvent solution containing the resin extract from the water; and (f) taking a sample of the resin extract from step (e) and subjecting said sample to high performance chromatography according to step (c) of claim 13.

15. The method of claim 14 wherein the partitioning solvent is a chlorinated organic solvent.

16. The method of claim 15 wherein the partitioning solvent is dichloromethane.

17. The method of claim 13 wherein the aqueous waste stream is associated with the production of petroleum or petroleum products.

18. The method of claim 13 wherein the activated non-ionic macroreticular polymeric resin is an essentially all aliphatic polymer comprising about 2 to 100 weight percent of a polyfunctional methacrylate containing at least three methacrylate groups.

19. The method of claim 18 wherein the activated non-ionic macroreticular polymeric resin has a surface area in the range of about 100 to 400 $m^2/g$ and an average pore diameter of about 80 to about 250 Å.

20. The method of claim 19 wherein the activated non-ionic macroreticular polymeric resin is AMBERLITE® XAD-7.

21. The method of claim 18 wherein the polyfunctional methacrylate is trimethylolpropane trimethacrylate.

22. The method of claim 13 wherein the extraction solvent is an organic solvent having a dielectric constant greater than about 4.0.

23. The method of claim 22 wherein the extraction solvent is methanol, acetone, dichloromethane, chloroform, diethyl ether or ethyl acetate or mixtures thereof.

24. The method of claim 23 wherein the extraction solvent is methanol.

25. The method of claim 13 wherein the high performance liquid chromatography is conducted using a reverse-phase column.

26. The method of claim 25 wherein the reverse-phase column is an octadecyl silane column.

27. The method of claim 26 wherein said column is first eluted using a linear triple solvent gradient consisting of water, acetonitrile and a dilute aqueous solution of acetic acid; and then purged with methanol.

* * * * *